United States Patent
Shirotori et al.

(10) Patent No.: US 12,462,834 B2
(45) Date of Patent: Nov. 4, 2025

(54) MAGNETIC HEAD AND MAGNETIC RECORDING DEVICE

(71) Applicant: KABUSHIKI KAISHA TOSHIBA, Tokyo (JP)

(72) Inventors: Satoshi Shirotori, Yokohama Kanagawa (JP); Tazumi Nagasawa, Yokohama Kanagawa (JP); Yoshihiro Higashi, Komatsu Ishikawa (JP); Akira Kikitsu, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 18/416,106

(22) Filed: Jan. 18, 2024

(65) Prior Publication Data
US 2025/0037737 A1 Jan. 30, 2025

(30) Foreign Application Priority Data
Jul. 28, 2023 (JP) .................................. 2023-123419

(51) Int. Cl.
G11B 5/31 (2006.01)
(52) U.S. Cl.
CPC .................................... G11B 5/315 (2013.01)
(58) Field of Classification Search
None
See application file for complete search history.

(56) References Cited

U.S. PATENT DOCUMENTS

| | | | |
|---|---|---|---|
| 7,576,948 B2 | 8/2009 | Covington et al. | |
| 9,214,171 B2 * | 12/2015 | Isowaki | H10N 50/10 |
| 9,293,160 B1 | 3/2016 | Mihajlovic et al. | |
| 2008/0074806 A1 * | 3/2008 | Sato | B82Y 25/00 |
| 2014/0043713 A1 * | 2/2014 | Isowaki | H01F 41/302 335/301 |
| 2016/0189746 A1 * | 6/2016 | Yamada | G11B 20/1217 360/48 |
| 2019/0272849 A1 * | 9/2019 | Yamagishi | G11B 5/35 |
| 2020/0090685 A1 * | 3/2020 | Takagishi | G11B 5/3146 |
| 2024/0135967 A1 * | 4/2024 | Nagasawa | G01R 33/0076 |
| 2024/0257829 A1 * | 8/2024 | Shirotori | G11B 5/11 |

* cited by examiner

*Primary Examiner* — William J Klimowicz
(74) *Attorney, Agent, or Firm* — Finnegan, Henderson, Farabow, Garrett & Dunner, LLP

(57) ABSTRACT

According to one embodiment, a magnetic head includes a reproducing section. The reproducing section includes a first shield, a second shield, a third shield, a fourth shield, a first magnetic layer, a first intermediate layer, and a second intermediate layer. A second direction from the third shield to the fourth shield crosses a first direction from the first shield to the second shield. The first magnetic layer is provided between the first shield and the second shield and between the third shield and the fourth shield. The first intermediate layer is provided between the first shield and the first magnetic layer, and is nonmagnetic. The second intermediate layer is provided between the first magnetic layer and the second shield, and is nonmagnetic. The second intermediate layer length of the second intermediate layer is shorter than a first intermediate layer length of the first intermediate layer along the second direction.

21 Claims, 12 Drawing Sheets

MAGNETIC HEAD AND MAGNETIC RECORDING DEVICE

CROSS-REFERENCE TO RELATED APPLICATIONS

This application is based upon and claims the benefit of priority from Japanese Patent Application No. 2023-123419, filed on Jul. 28, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head that includes a magnetic sensor. It is desired to improve the characteristics of magnetic heads.

DETAILED DESCRIPTION

Figure 1:
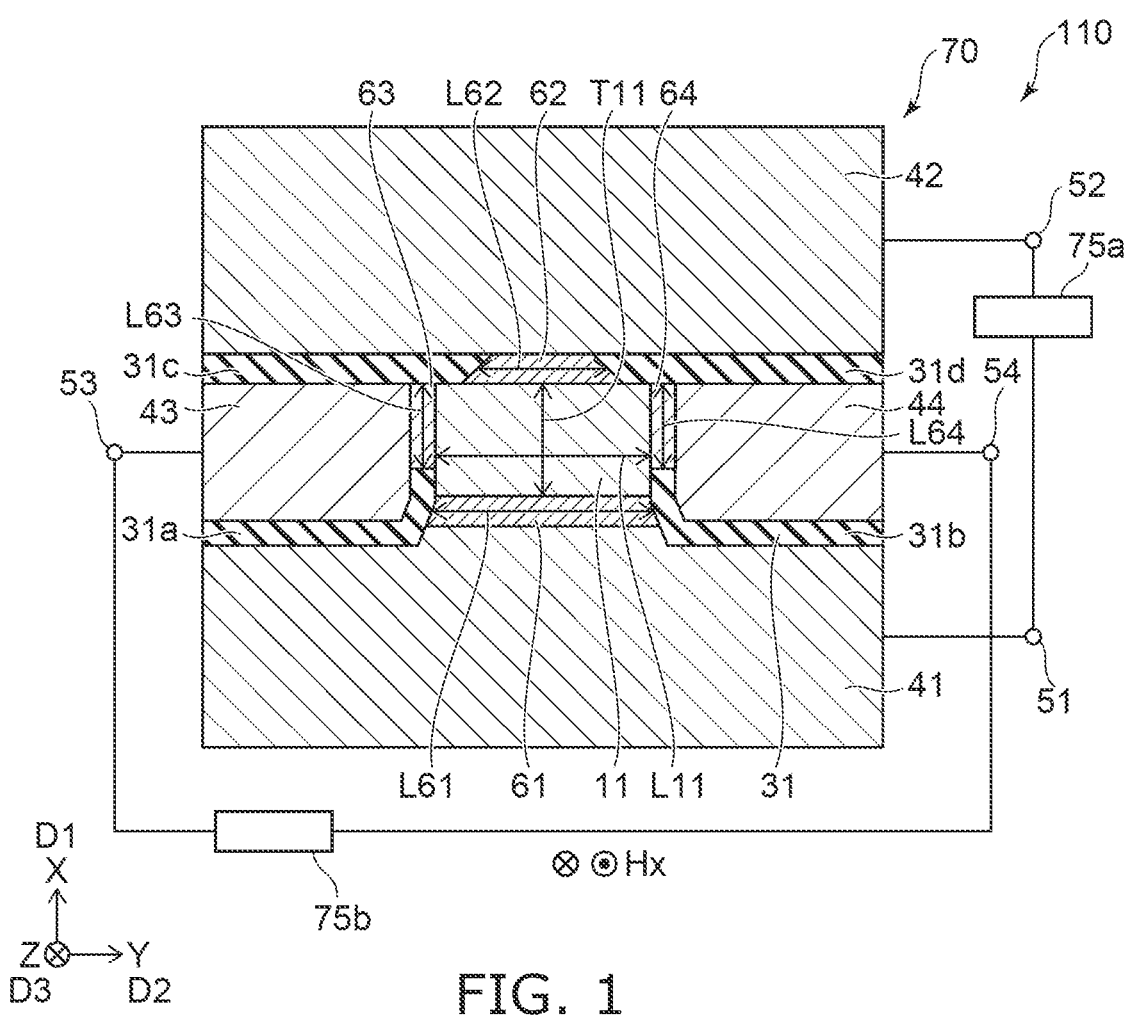
FIG. 1 is a schematic cross-sectional view illustrating a magnetic head according to a first embodiment.

According to one embodiment, a magnetic head includes a reproducing section. The reproducing section includes a first shield, a second shield, a third shield, a fourth shield, a first magnetic layer, a first intermediate layer, and a second intermediate layer. A second direction from the third shield to the fourth shield crosses a first direction from the first shield to the second shield. The first magnetic layer is provided between the first shield and the second shield and between the third shield and the fourth shield. The first intermediate layer is provided between the first shield and the first magnetic layer, and is nonmagnetic. The second intermediate layer is provided between the first magnetic layer and the second shield, and is nonmagnetic. The second intermediate layer length of the second intermediate layer along the second direction is shorter than a first intermediate layer length of the first intermediate layer along the second direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

As shown in FIG. 1, a magnetic head 110 according to the embodiment includes a reproducing section 70. The reproducing section 70 includes a first shield 41, a second shield 42, a third shield 43, a fourth shield 44, a first magnetic layer 11, a first intermediate layer 61, and a second intermediate layer 62.

A second direction D2 from the third shield 43 to the fourth shield 44 crosses a first direction D1 from the first shield 41 to the second shield 42.

In this example, the first direction D1 is defined as an X-axis direction. One direction perpendicular to the X-axis direction is defined as a Y-axis direction. A direction perpendicular to the X-axis direction and the Y-axis direction is defined as a Z-axis direction. The second direction D2 is, for example, the Y-axis direction.

The first magnetic layer 11 is provided between the first shield 41 and the second shield 42 and between the third shield 43 and the fourth shield 44. The first intermediate layer 61 is provided between the first shield 41 and the first magnetic layer 11. The first intermediate layer 61 is nonmagnetic. The second intermediate layer 62 is provided between the first magnetic layer 11 and the second shield 42. The second intermediate layer 62 is nonmagnetic.

A length of the second intermediate layer 62 along the second direction D2 is defined as a second intermediate layer length L62. A length of the first intermediate layer 61 along the second direction D2 is defined as a first intermediate layer length L61. The second intermediate layer length L62 is shorter than the first intermediate layer length L61.

As shown in FIG. 1, in one example, the reproducing section 70 includes a first terminal 51, a second terminal 52, a third terminal 53, and a fourth terminal 54. The first terminal 51 is electrically connected to the first shield 41. The second terminal 52 is electrically connected to the second shield 42. The third terminal 53 is electrically connected to the third shield 43. The fourth terminal 54 is electrically connected to the fourth shield 44.

For example, a first circuit 75a and a second circuit 75b may be provided. The first circuit 75a is electrically connected to the first terminal 51 and the second terminal 52. The second circuit 75b is electrically connected to the third terminal 53 and the fourth terminal 54. In one example, the second circuit 75b supplies current between the third terminal 53 and the fourth terminal 54. The current passes through the third shield 43, the first magnetic layer 11, and the fourth shield 44. At this time, for example, the voltage between the first terminal 51 and the second terminal 52 changes depending on a detection target magnetic field Hx. The change in voltage is considered to be caused by, for example, an anomalous Hall effect.

The changes in voltage is detected by the first circuit 75a. Thereby, the detection target magnetic field Hx can be detected. Thus, the voltage between the first terminal 51 and the second terminal 52 when the current flows between the third terminal 53 and the fourth terminal 54 can be changed depending on the detection target magnetic field Hx. The detection target magnetic field Hx is based on, for example, information recorded on a magnetic recording medium.

In the embodiment, the first circuit 75a and the second circuit 75b may be considered to be included in the magnetic head 110 for convenience. The first circuit 75a and the second circuit 75b may be provided separately from the magnetic head 110. These circuits may be included in a magnetic recording device. The first circuit 75a includes, for example, a voltmeter. The second circuit 75b includes, for example, a current source.

In the embodiment, the first intermediate layer 61 and the second intermediate layer 62 as described above are provided. The current may pass not only through the first magnetic layer 11 but also through these intermediate layers. The current passing through these intermediate layers (leakage current or sneak current) does not contribute to the change in voltage. The current passing through these intermediate layers reduces detection sensitivity. By shortening the lengths of these intermediate layers, the influence of leakage current flowing through the intermediate layers can be reduced. On the other hand, by providing these intermediate layers, good low electrical resistance can be obtained during voltage detection, and for example, the influence of noise can be reduced.

In the embodiment, the second intermediate layer length L62 of the second intermediate layer 62 is shorter than the first intermediate layer length L61 of the first intermediate layer 61. Thereby, the leakage current is suppressed. Increase in electrical resistance is suppressed. According to the embodiment, high detection sensitivity can be obtained. Highly 20 accurate detection can be obtained. According to the embodiment, a magnetic head with improved characteristics can be provided.

Thus, in the embodiment, an asymmetrical configuration is applied to the first intermediate layer 61 and the second intermediate layer 62. The asymmetric configurations are easier to manufacture. A practical magnetic head 110 can be provided.

As shown in FIG. 1, a length of the first magnetic layer 11 along the second direction D2 is defined as a first magnetic layer length L11. The first magnetic layer length L11 is preferably between the first intermediate layer length L61 and the second intermediate layer length L62. Leakage current can be suppressed more effectively.

As described above, the first magnetic layer 11 has, for example, the anomalous Hall effect. For example, the first magnetic layer 11 may include at least one selected from the group consisting of $Co_2MnGa$, $CoMnAl$, and $FePt$. With these materials, the anomalous Hall effect can be effectively obtained.

In one example, at least one of the first intermediate layer 61 or the second intermediate layer 62 includes at least one selected from the group consisting of Cu, Au, Ag, Pt, Al, Pd, Ta, Ru, Hf, W, Mo, Ir, Cr, Tb, and Rh. These materials can suppress the influence of spin between the shield and the first magnetic layer 11, for example. It becomes easy to obtain high sensitivity.

As shown in FIG. 1, the reproducing section 70 may further include a third intermediate layer 63 and a fourth intermediate layer 64. The third intermediate layer 63 is provided between the third shield 43 and the first magnetic layer 11 and is nonmagnetic. The fourth intermediate layer 64 is provided between the first magnetic layer 11 and the fourth shield 44 and is nonmagnetic.

A length of the third intermediate layer 63 along the first direction D1 is defined as a third intermediate layer length L63. A length of the first magnetic layer 11 along the first direction D1 is defined as a first magnetic layer thickness T11. For example, the third intermediate layer length L63 is shorter than the first magnetic layer thickness T11. A length of the fourth intermediate layer 64 along the first direction D1 is defined as a fourth intermediate layer length L64. For example, the fourth intermediate layer length L64 is shorter than the first magnetic layer thickness T11. Such a configuration suppresses the influence of these intermediate layers on voltage detection. Higher sensitivity can be easily obtained.

As shown in FIG. 1, the reproducing section 70 may further include a first insulating member 31. The first insulating member 31 includes a first insulating region 31a and a second insulating region 31b. A part of the first insulating region 31a is provided between a part of the third shield 43 and a part of the first magnetic layer 11. A part of the second insulating region 31b is provided between a part of the first magnetic layer 11 and a part of the fourth shield 44.

As shown in FIG. 1, another part of the first insulating region 31a is provided between the first shield 41 and the third shield 43. Another part of the second insulating region 31b is provided between the first shield 41 and the fourth shield 44.

As shown in FIG. 1, the first insulating member 31 may further include a third insulating region 31c and a fourth insulating region 31d. A part of the third insulating region 31c is provided between a portion of the first magnetic layer 11 and the second shield 42. A part of the fourth insulating region 31d is provided between another part of the first magnetic layer 11 and the second shield 42.

As shown in FIG. 1, another part of the third insulating region 31c is provided between the third shield 43 and the second shield 42. Another part of the fourth insulating region 31d is provided between the fourth shield 44 and the second shield 42.

In this example, the third shield 43 and the fourth shield 44 are provided between the first shield 41 and the second shield 42. The third shield 43 and the fourth shield 44 overlap the first shield 41 and the second shield 42 in the first direction D1. The third shield 43 and the fourth shield 44 may not overlap the first shield 41 and the second shield 42 in the first direction D1.

Figure 2:
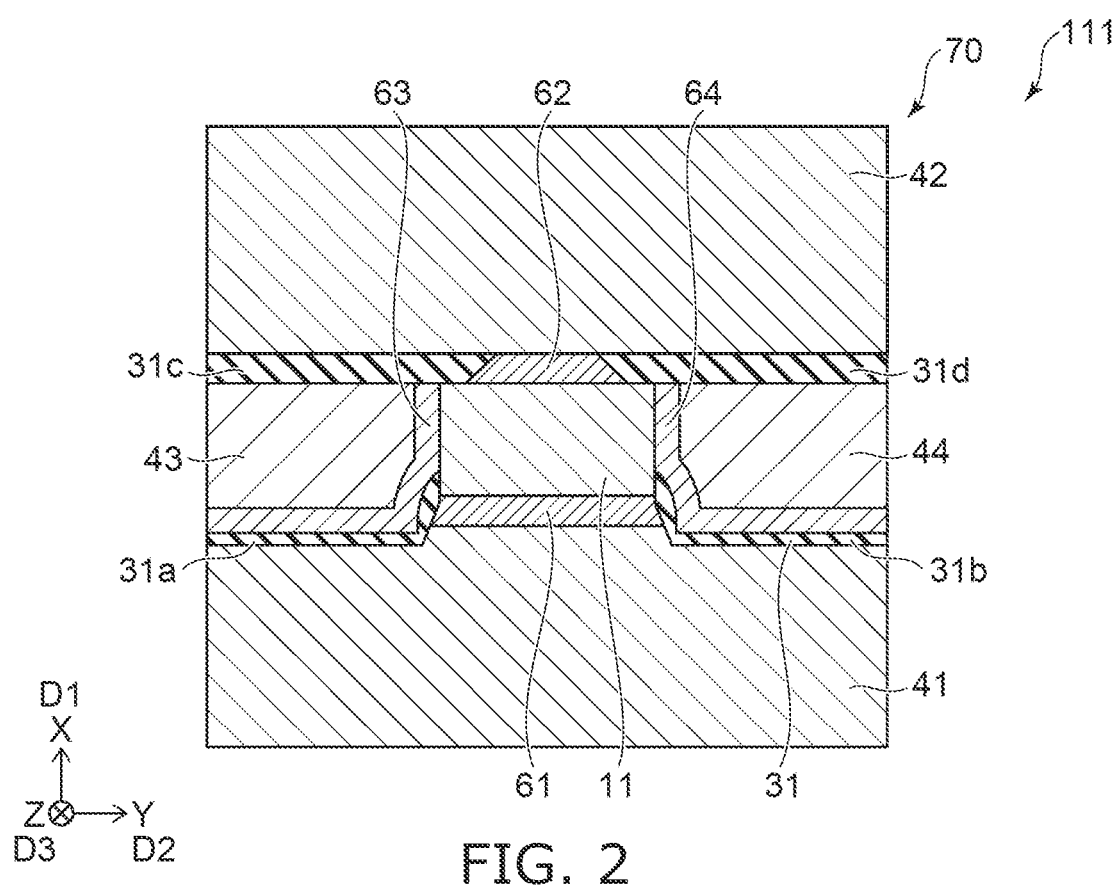
FIG. 2 is a schematic cross-sectional view illustrating a magnetic head according to the first embodiment.

FIG. 2 is a schematic cross-sectional view illustrating a magnetic head according to the first embodiment.

As shown in FIG. 2, in a magnetic head 111 according to the embodiment, the configuration of the intermediate layer is different from the configuration of the intermediate layer in the magnetic head 110. The configuration of the magnetic head 111 except for this may be the same as the configuration of the magnetic head 110.

In the magnetic head 111, at least a part of the first intermediate layer 61 is provided between the third shield 43 and the fourth shield 44 in the second direction D2. In such a magnetic head 111, leakage current can be suppressed as well.

In the magnetic head 111, a part of the third intermediate layer 63 extends between the first shield 41 and the third shield 43. A part of the fourth intermediate layer 64 extends between the first shield 41 and the fourth shield 44.

Figure 3:
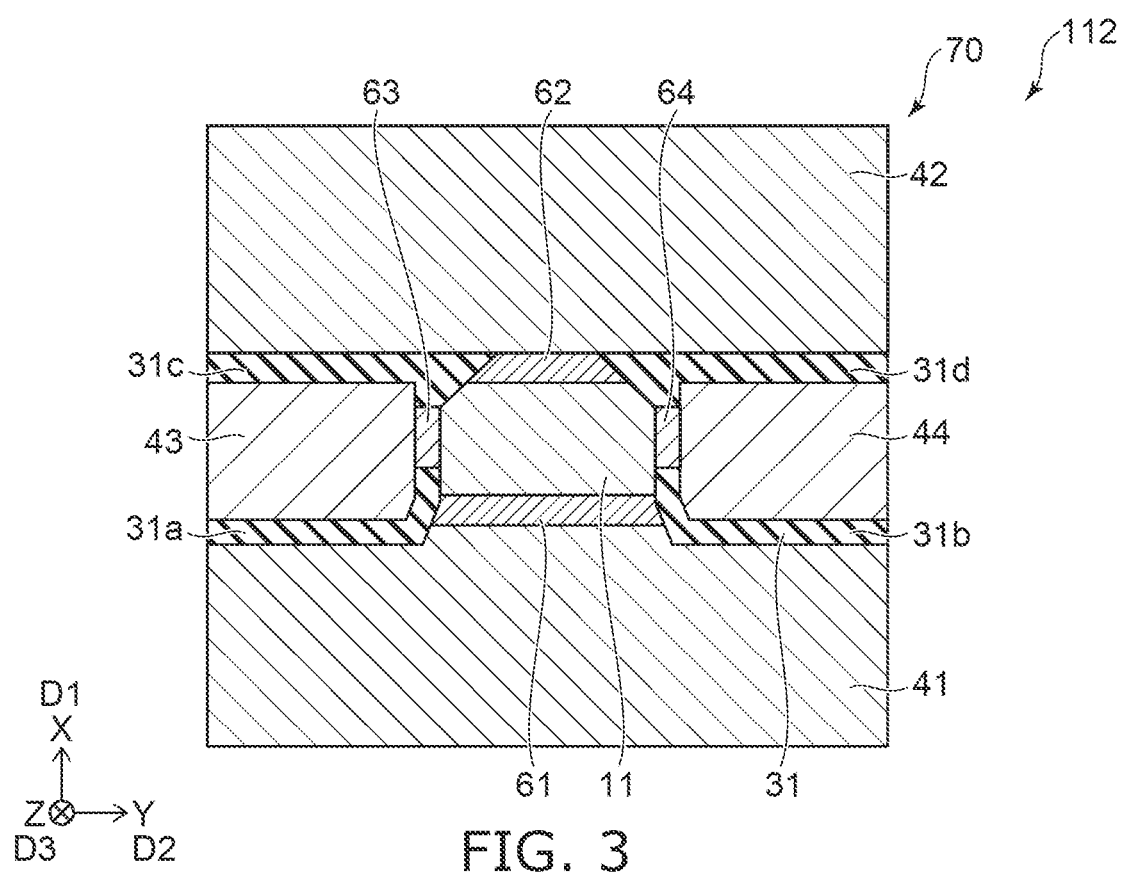
FIG. 3 is a schematic cross-sectional view illustrating a magnetic head according to the first embodiment.

FIG. 3 is a schematic cross-sectional view illustrating a magnetic head according to the first embodiment.

As shown in FIG. 3, in a magnetic head 112 according to the embodiment, the configuration of the intermediate layer is different from the configuration of the intermediate layer in the magnetic head 110. The configuration of the magnetic head 112 except for this may be the same as the configuration of the magnetic head 110.

In the magnetic head 112, a part of the third insulating region 31$c$ is provided between the third shield 43 and the first magnetic layer 11 in the second direction D2. A part of the fourth insulating region 31$d$ is provided between the first magnetic layer 11 and the fourth shield 44 in the second direction D2. In such a magnetic head 112, leakage current can be suppressed as well.

Figure 4:
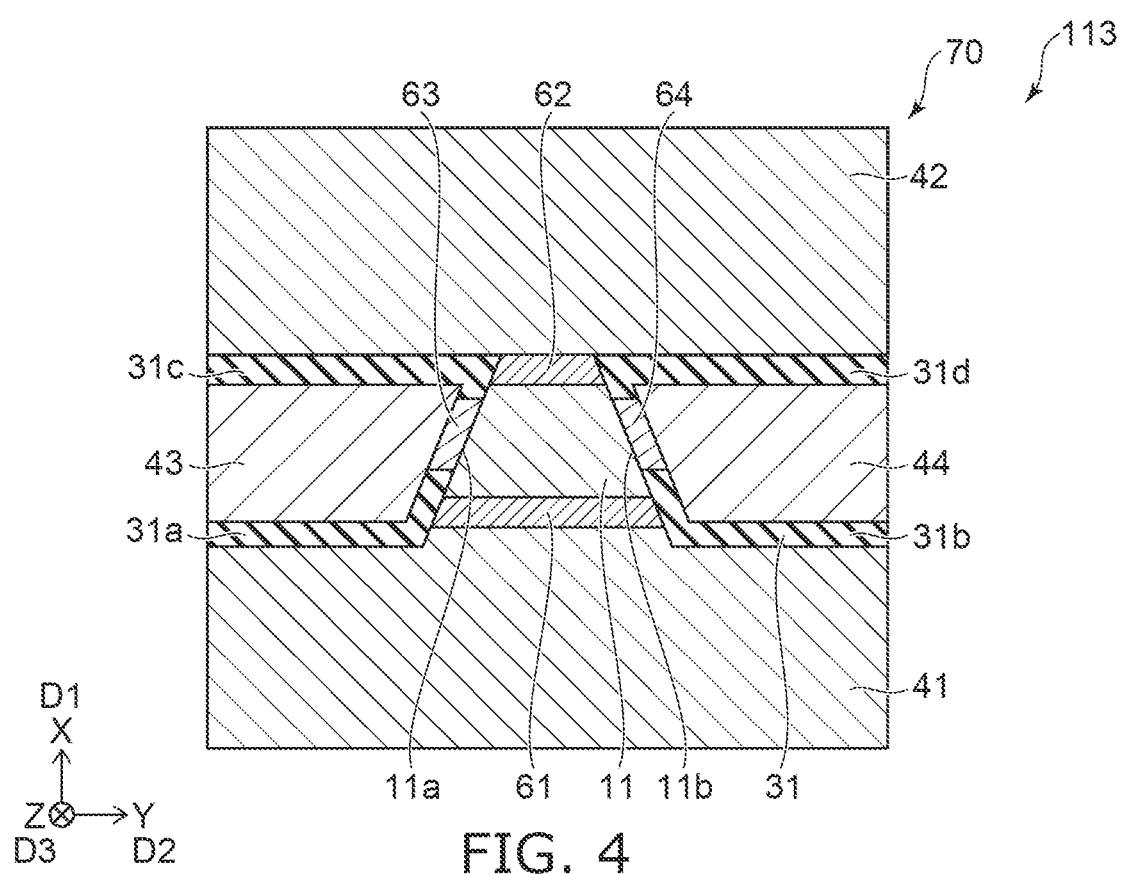
FIG. 4 is a schematic cross-sectional view illustrating a magnetic head according to the first embodiment.

FIG. 4 is a schematic cross-sectional view illustrating a magnetic head according to the first embodiment.

As shown in FIG. 4, in a magnetic head 113 according to the embodiment, the configuration of the first magnetic layer 11 is different from the configuration of the first magnetic layer 11 in the magnetic head 110. The configuration of the magnetic head 113 except for this may be the same as the configuration of the magnetic head 110.

In the magnetic head 113, the first magnetic layer 11 includes a first side face 11$a$ facing the third intermediate layer 63. The first side face 11$a$ is inclined with respect to the first direction D1. The first magnetic layer 11 includes a second side face 11$b$ facing the fourth intermediate layer 64. The second side face 11$b$ is inclined with respect to the first direction D1. The length of the first magnetic layer 11 along the second direction D2 decreases in the direction from the first shield 41 to the second shield 42. In such a magnetic head 113, leakage current can be further suppressed.

Figure 5:
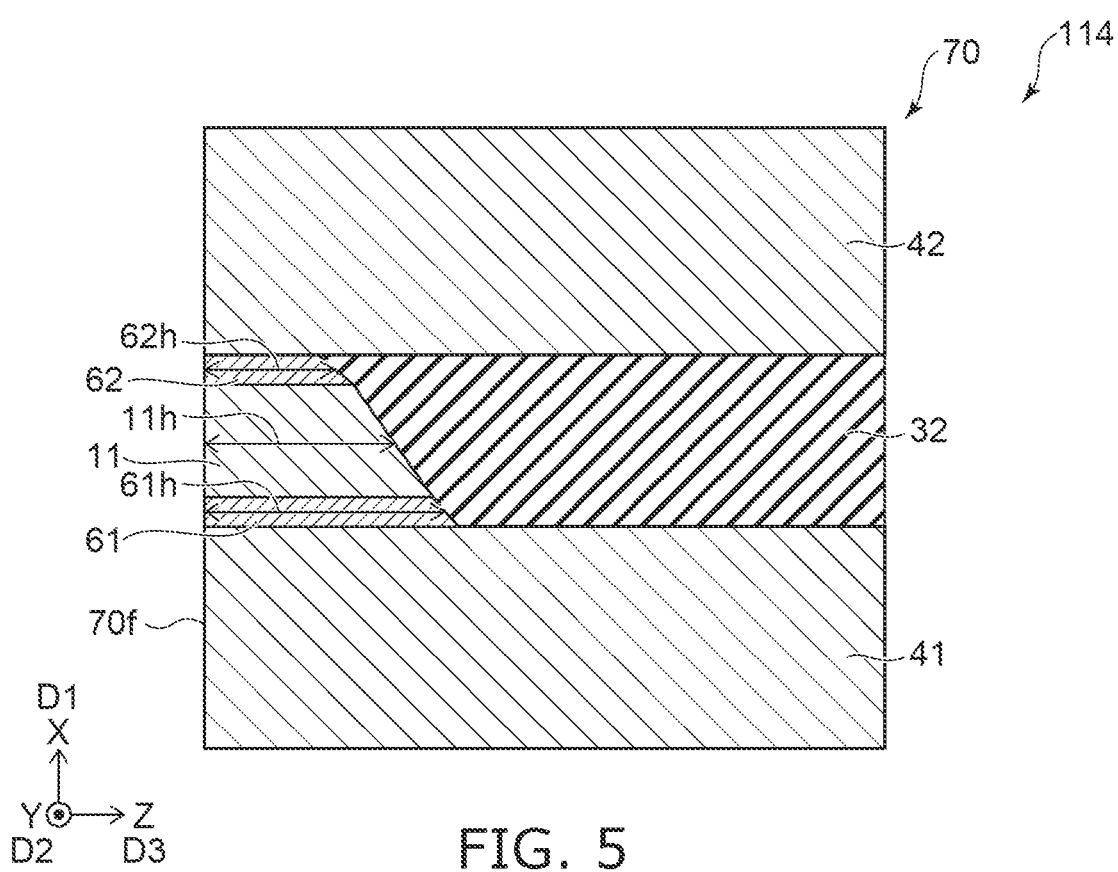
FIG. 5 is a schematic cross-sectional view illustrating a magnetic head according to the first embodiment.

FIG. 5 is a schematic cross-sectional view illustrating a magnetic head according to the first embodiment.

As shown in FIG. 5, in a magnetic head 114 according to the embodiment, the first intermediate layer 61 and the second intermediate layer 62 have different lengths along the Z-axis direction. The configuration of the magnetic head 114 except for this may be the same as the configuration of the magnetic head 110 and the like.

In the magnetic head 114, a length 62$h$ of the second intermediate layer 62 along a third direction D3 is shorter than a length 61$h$ of the first intermediate layer 61 along the third direction D3. The third direction D3 crosses a plane including the first direction D1 and the second direction D2. The third direction D3 may be, for example, the Z-axis direction. In such a magnetic head 114, leakage current can be suppressed as well.

As shown in FIG. 5, a length 11$h$ of the first magnetic layer 11 in the third direction D3 may be between the length 62$h$ of the second intermediate layer 62 in the third direction D3 and the length 61$h$ of the first intermediate layer 61 in the third direction D3.

As shown in FIG. 5, the reproducing section 70 may further include a second insulating member 32. The second insulating member 32 is provided between the first shield 41 and the second shield 42. A direction from the first intermediate layer 61 to the second insulating member 32 is along the third direction D3. A direction from the first magnetic layer 11 to the second insulating member 32 is along the third direction D3. A direction from the second intermediate layer 62 to the second insulating member 32 is along the third direction D3.

As shown in FIG. 5, for example, the first shield 41 includes a medium facing face 70$f$. The second insulating member 32 separates from the medium facing face 70$f$ in the third direction D3.

Figure 6:
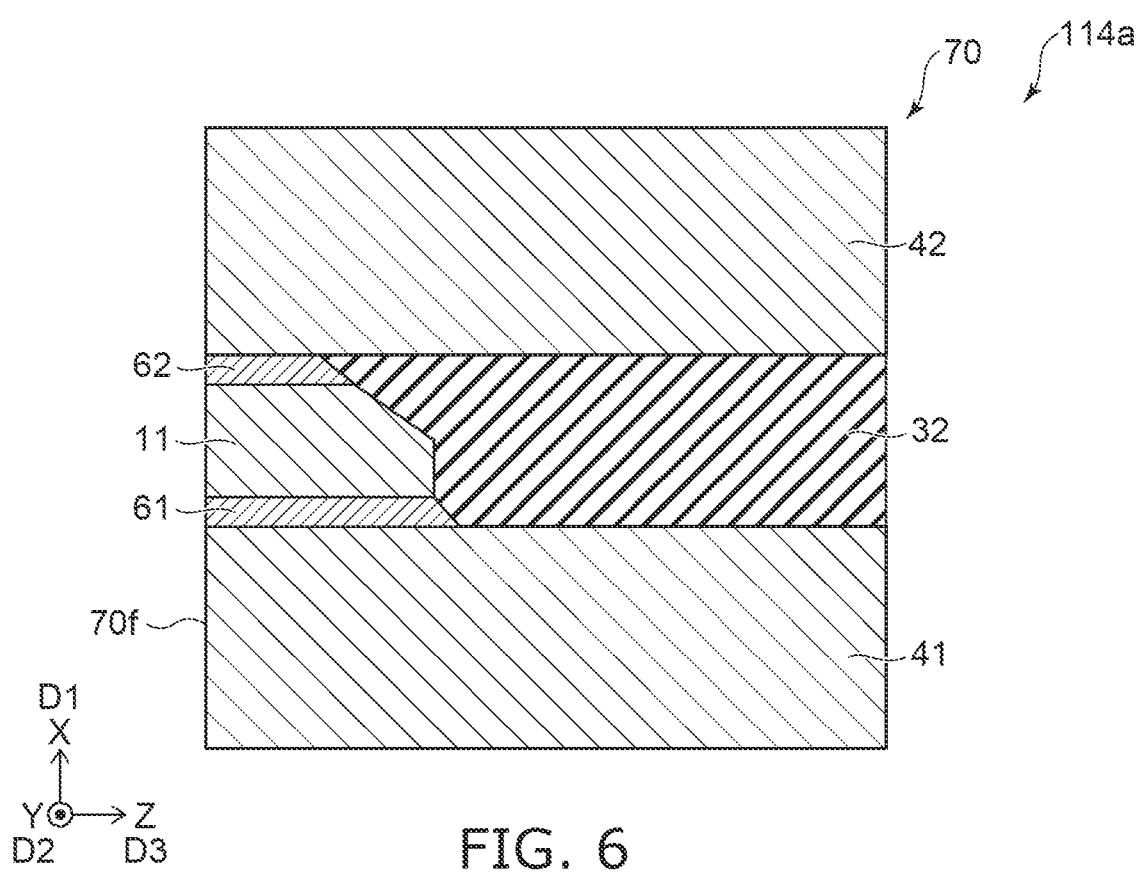
FIG. 6 is a schematic cross-sectional view illustrating a magnetic head according to the first embodiment.

FIG. 6 is a schematic cross-sectional view illustrating a magnetic head according to the first embodiment.

As shown in FIG. 6, in a magnetic head 114$a$ according to the embodiment, the configuration of the first magnetic layer 11 is different from the configuration in the magnetic head 114. The configuration of the magnetic head 114$a$ except for this may be the same as the configuration of the magnetic head 114. In the magnetic head 114$a$, the first magnetic layer 11 protrudes from the side face of the first intermediate layer 61 and the side face of the second intermediate layer 62. In such a magnetic head 114$a$, leakage current can be suppressed as well.

Figure 7:
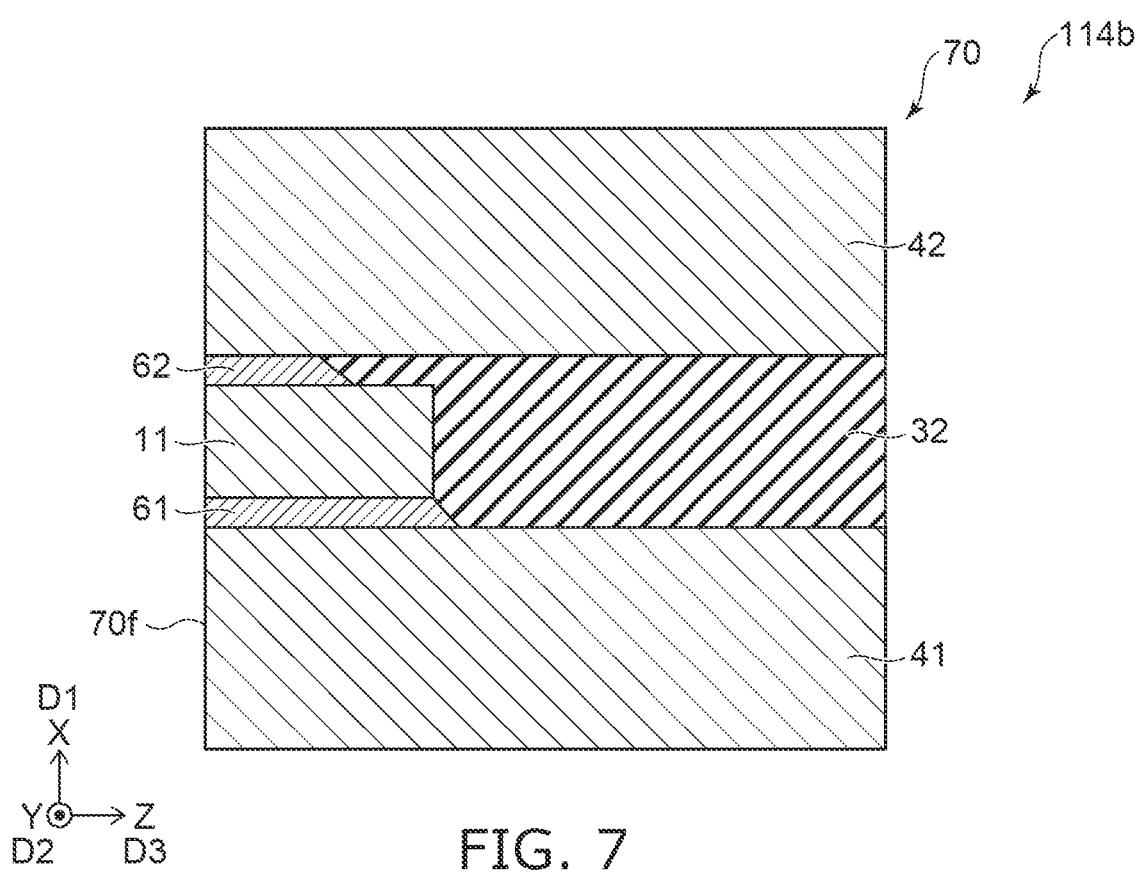
FIG. 7 is a schematic cross-sectional view illustrating a magnetic head according to the first embodiment.

FIG. 7 is a schematic cross-sectional view illustrating a magnetic head according to the first embodiment.

As shown in FIG. 7, in a magnetic head 114$b$ according to the embodiment, the configuration of the first magnetic layer 11 is different from the configuration in the magnetic head 114. The configuration of the magnetic head 114$b$ except for this may be the same as the configuration of the magnetic head 114. In the magnetic head 114$b$, the first magnetic layer 11 protrudes from the side face of the first intermediate layer 61 and the side face of the second intermediate layer 62. In the magnetic head 114$b$, the length of the first magnetic layer 11 along the third direction D3 is substantially constant. In such a magnetic head 114$b$, leakage current can be suppressed as well.

Figure 8:
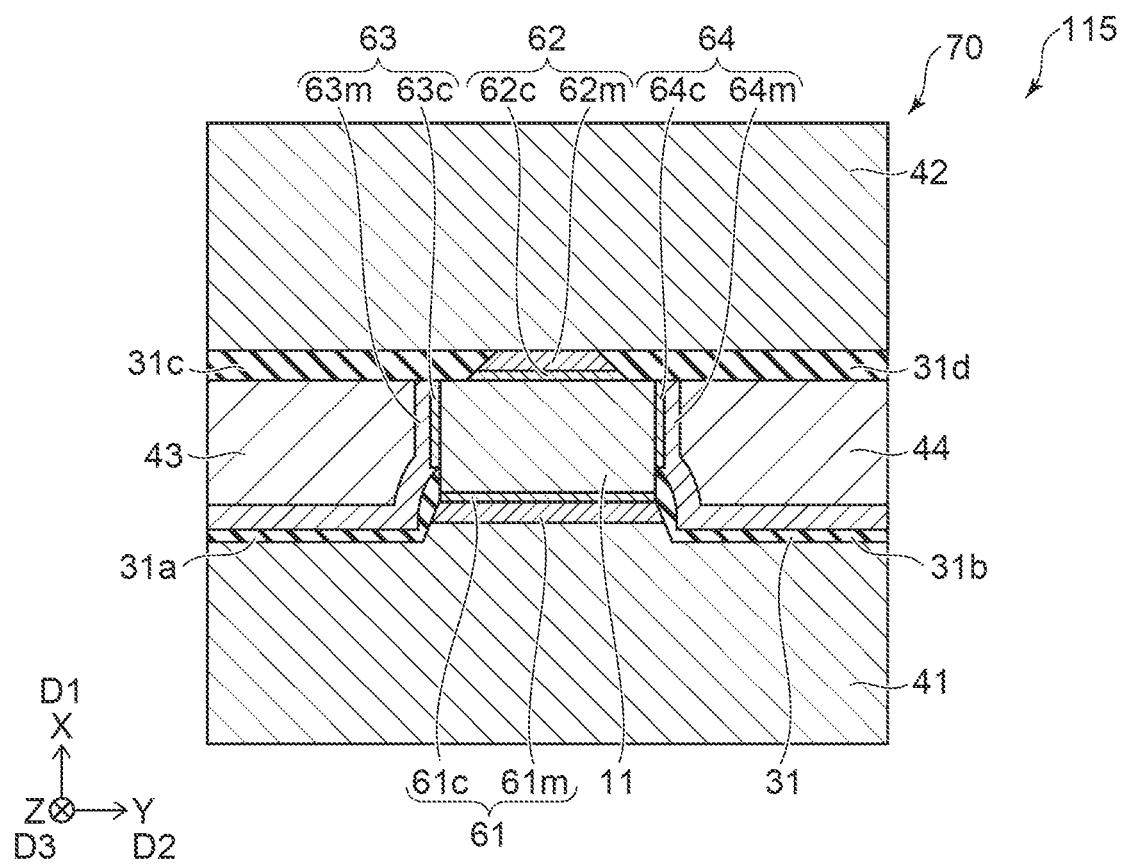
FIG. 8 is a schematic cross-sectional view illustrating a magnetic head according to the first embodiment.

FIG. 8 is a schematic cross-sectional view illustrating a magnetic head according to the first embodiment.

As shown in FIG. 8, in a magnetic head 115 according to the embodiment, the configuration of the intermediate layer is different from the configuration of the intermediate layer of the magnetic head 110. The configuration of the magnetic head 115 except for this may be the same as the configuration of the magnetic head 110.

As shown in FIG. 8, in the magnetic head 115, the first intermediate layer 61 includes a first metal layer 61$m$ and a first compound layer 61$c$. The first compound layer 61$c$ is provided between the first metal layer 61$m$ and the first magnetic layer 11. The first compound layer 61$c$ includes, for example, at least one selected from the group consisting of MgO, MgAlO, $SiO_2$, $Al_2O_3$, AlN, $Mg_3N_2$, HfO, and HfN. The first metal layer 61$m$ includes metal. In such a first intermediate layer 61, a current path with appropriate electrical resistance can be easily obtained. For example, leakage current can be suppressed more effectively.

The second intermediate layer 62 includes a second metal layer 62$m$ and a second compound layer 62$c$. The second compound layer 62$c$ is provided between the first magnetic layer 11 and the second metal layer 62$m$. The second compound layer 62$c$ includes, for example, at least one selected from the group consisting of MgO, MgAlO, $SiO_2$, $Al_2O_3$, AlN, $Mg_3N_2$, HfO, and HfN. The second metal layer 62$m$ includes metal. In such a second intermediate layer 62, a current path with appropriate electrical resistance can be easily obtained. For example, leakage current can be suppressed more effectively.

The third intermediate layer 63 may include a third metal layer 63$m$ and a third compound layer 63$c$. The third compound layer 63$c$ is provided between the third metal layer 63m and the first magnetic layer 11. The third compound layer 63c includes, for example, at least one selected from the group consisting of MgO, MgAlO, $SiO_2$, $Al_2O_3$, AlN, $Mg_3N_2$, HfO, and HfN. The third metal layer 63m includes metal. In such a third intermediate layer 63, a current path with appropriate electrical resistance can be easily obtained. For example, leakage current can be suppressed more effectively.

The fourth intermediate layer 64 includes a fourth metal layer 64m and a fourth compound layer 64c. The fourth compound layer 64c is provided between the first magnetic layer 11 and the fourth metal layer 64m. The fourth compound layer 64c includes, for example, at least one selected from the group consisting of MgO, MgAlO, $SiO_2$, $Al_2O_3$, AlN, $Mg_3N_2$, HfO, and HfN. The fourth metal layer 64m includes metal. In such a third intermediate layer 63, a current path with appropriate electrical resistance can be easily obtained. For example, leakage current can be suppressed more effectively.

At least one of the first metal layer 61m, the second metal layer 62m, the third metal layer 63m or the fourth metal layer 64m includes, for example, at least one selected from the group consisting of Cu, Au, Ag, Pt, Al, Pd, Ta, Ru, Hf, W, Mo, Ir, Cr, Tb and Rh. For example, the effect of spin can be suppressed.

The electrical resistivity of the first compound layer 61c is preferably more than 1 times and not more than 5 times the electrical resistivity of the first magnetic layer 11. By the electrical resistivity of the first compound layer 61c exceeding the electrical resistivity of the first magnetic layer 11, a high shunt suppressing effect can be obtained. In a case where the electrical resistivity of the first compound layer 61c exceeds 5 times the electrical resistivity of the first magnetic layer 11, for example, noise becomes large and the S/N ratio tends to decrease.

Figure 9:
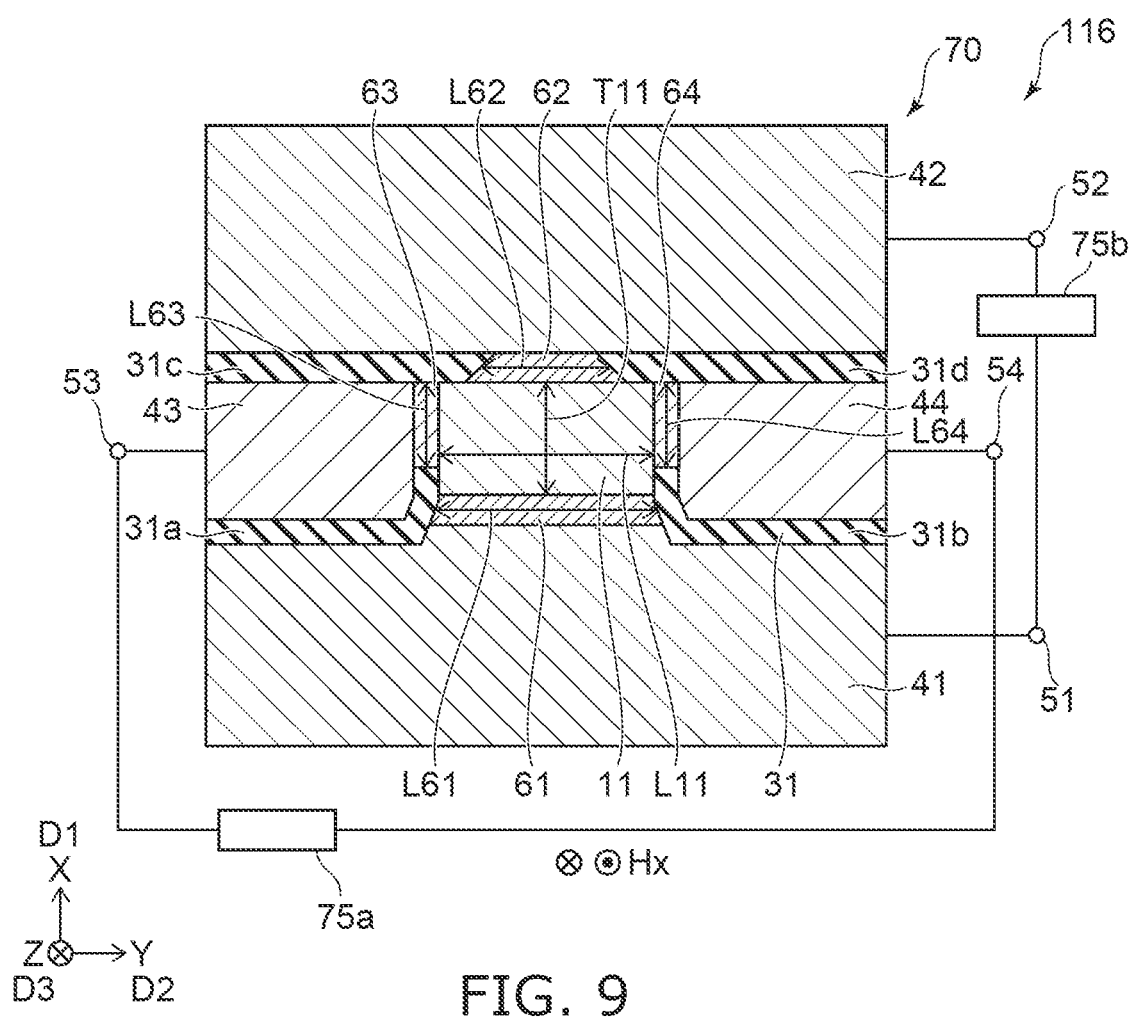
FIG. 9 is a schematic cross-sectional view illustrating a magnetic head according to the first embodiment.

FIG. 9 is a schematic cross-sectional view illustrating a magnetic head according to the first embodiment.

As shown in FIG. 9, in a magnetic head 116 according to the embodiment, the circuit connection relationship is different from the configuration in the magnetic head 110. The configuration of the magnetic head 116 except for this may be the same as the configuration of the magnetic head 110.

In the magnetic head 116, the first circuit 75a is electrically connected to the third terminal 53 and the fourth terminal 54. The second circuit 75b is electrically connected to the first terminal 51 and the second terminal 52. In the magnetic head 116, the voltage between the third terminal 53 and the fourth terminal 54 when a current flows between the first terminal 51 and the second terminal 52 can change depending on the detection target magnetic field Hx. Leakage current can also be suppressed in the magnetic head 116. A magnetic head with improved characteristics can be provided.

Second Embodiment

Figure 10:
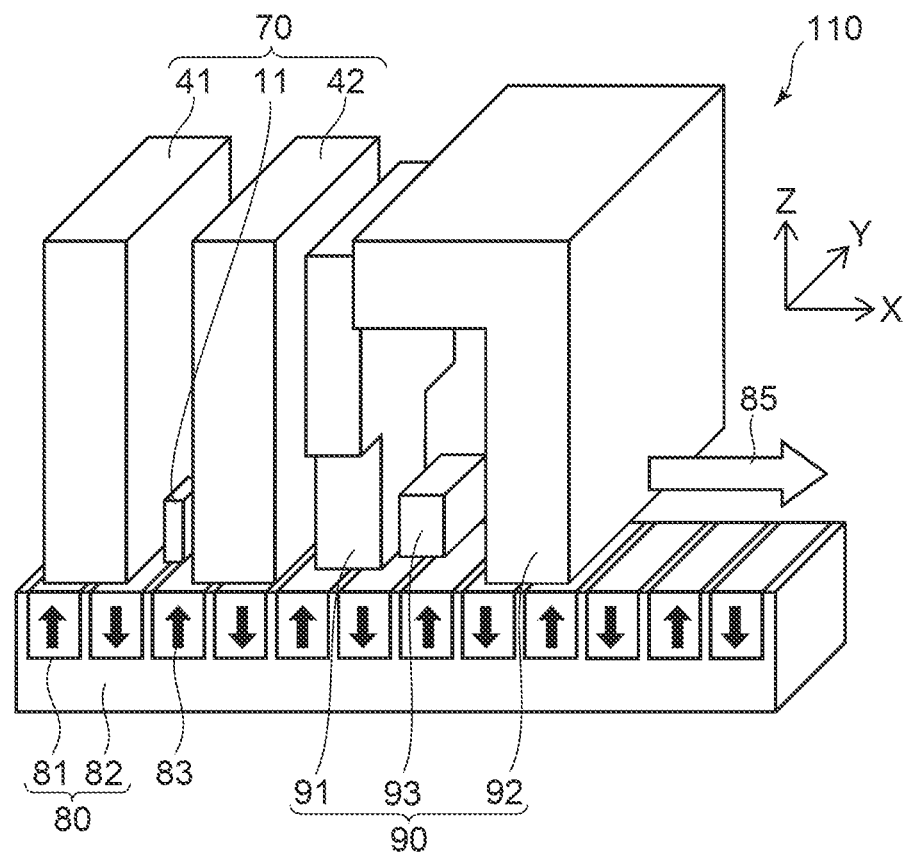
FIG. 10 is a schematic perspective view illustrating a magnetic head and a magnetic recording device according to a second embodiment.

FIG. 10 is a schematic perspective view illustrating a magnetic head and a magnetic recording device according to the second embodiment.

As shown in FIG. 10, a magnetic head 110 according to the embodiment includes the reproducing section 70. The magnetic head 110 is used together with a magnetic recording medium 80. In this example, the magnetic head 110 includes recording section 90. Information is recorded on the magnetic recording medium 80 by the recording section 90 of the magnetic head 110. The reproducing section 70 reproduces information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording section 90. The recording section 90 includes, for example, a first magnetic pole 91 and a second magnetic pole 92. The first magnetic pole 91 is, for example, a major magnetic pole. The second magnetic pole 92 is, for example, a trailing shield. The recording section 90 may include a recording section element 93. The recording section element 93 may include a magnetic field control element, a high frequency oscillation element, or the like. The recording section element 93 may be omitted.

The reproducing section 70 includes, for example, the first shield 41, the second shield 42, and the first magnetic layer 11. In FIG. 10, the third shield 43 and fourth shield 44 are omitted. The reproducing section 70 is configured to output a signal according to the magnetization 83 of the magnetic recording layer 81.

As shown in FIG. 10, the magnetic recording medium 80 moves relative to the magnetic head 110 in a medium movement direction 85. The magnetic head 110 controls information corresponding to the magnetization 83 of the magnetic recording layer 81 at an arbitrary position. The magnetic head 110 reproduces information corresponding to the magnetization 83 of the magnetic recording layer 81 at an arbitrary position.

The X-axis direction corresponds to, for example, the down-track direction. The Y-axis direction corresponds to, for example, the cross-track direction. The Z-axis direction corresponds to, for example, the high direction.

Figure 11:
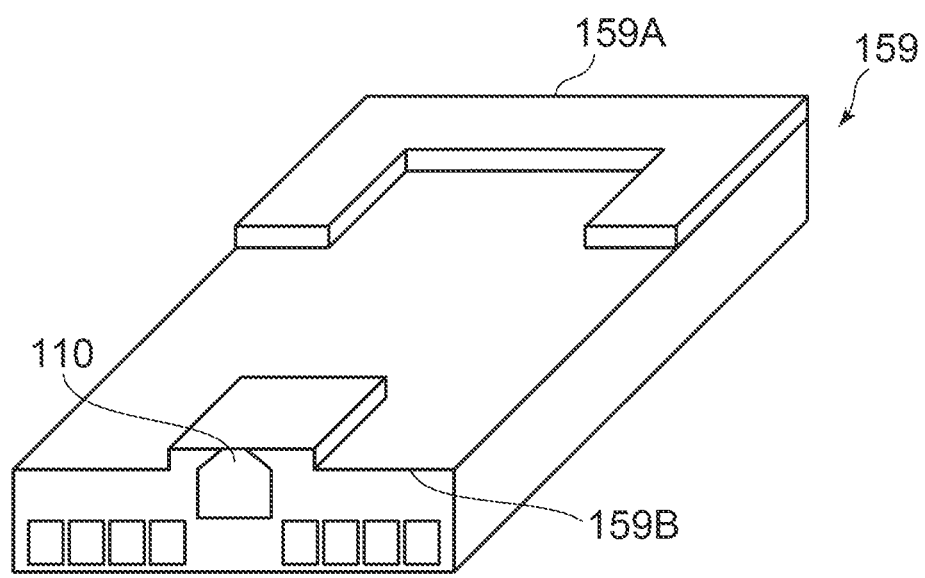
FIG. 11 is a schematic perspective view illustrating a part of the magnetic recording device according to the embodiment.

FIG. 11 is a schematic perspective view illustrating a part of the magnetic recording device according to the embodiment.

FIG. 11 illustrates a head slider.

The magnetic head 110 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 12:
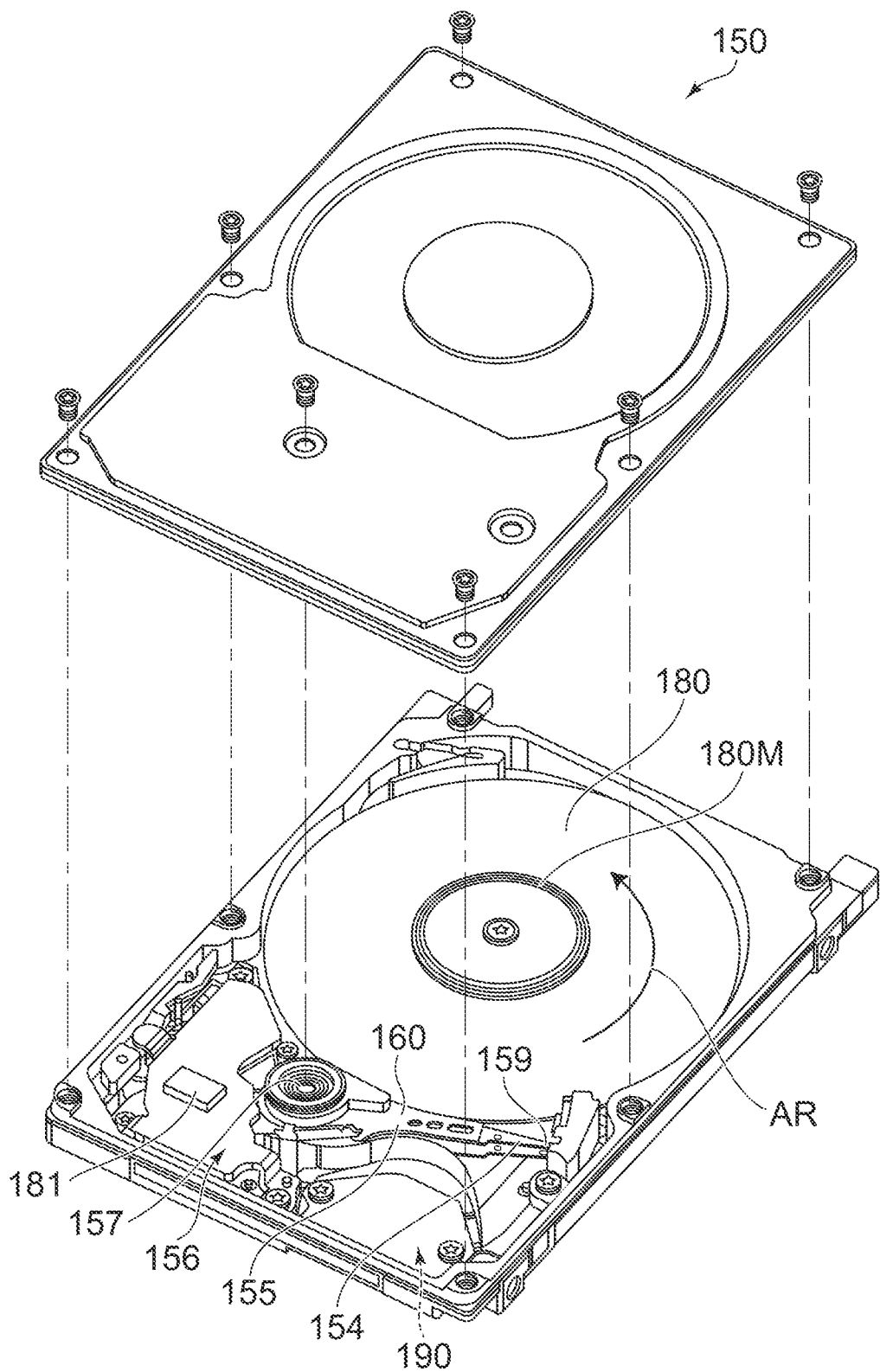
FIG. 12 is a schematic perspective view illustrating the magnetic recording device according to the embodiment.

FIG. 12 is a schematic perspective view illustrating the magnetic recording device according to the embodiment.

Figure 13A:
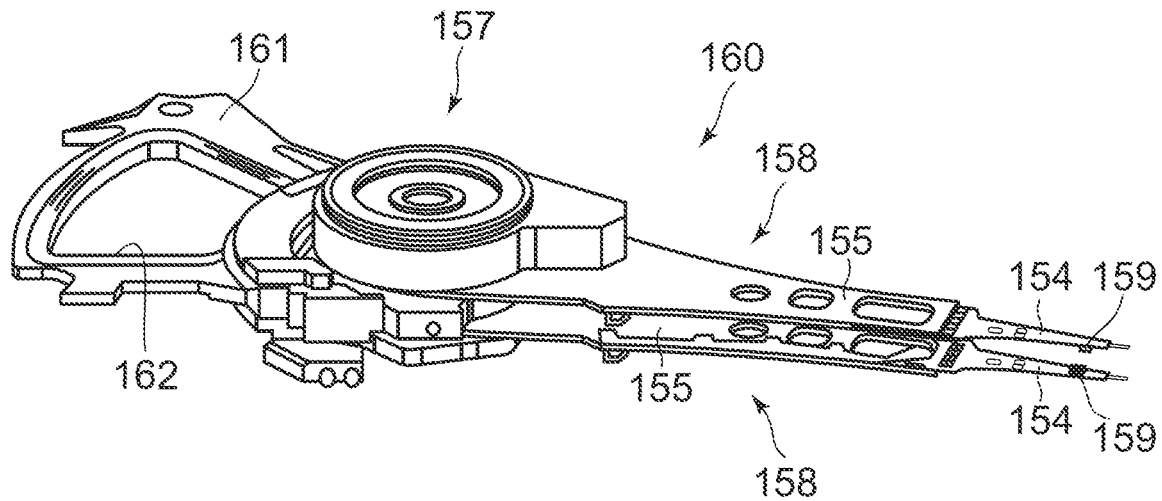
FIGS. 13A and 13B are schematic perspective views illustrating a part of the magnetic recording device according to the embodiment.
Figure 13B:
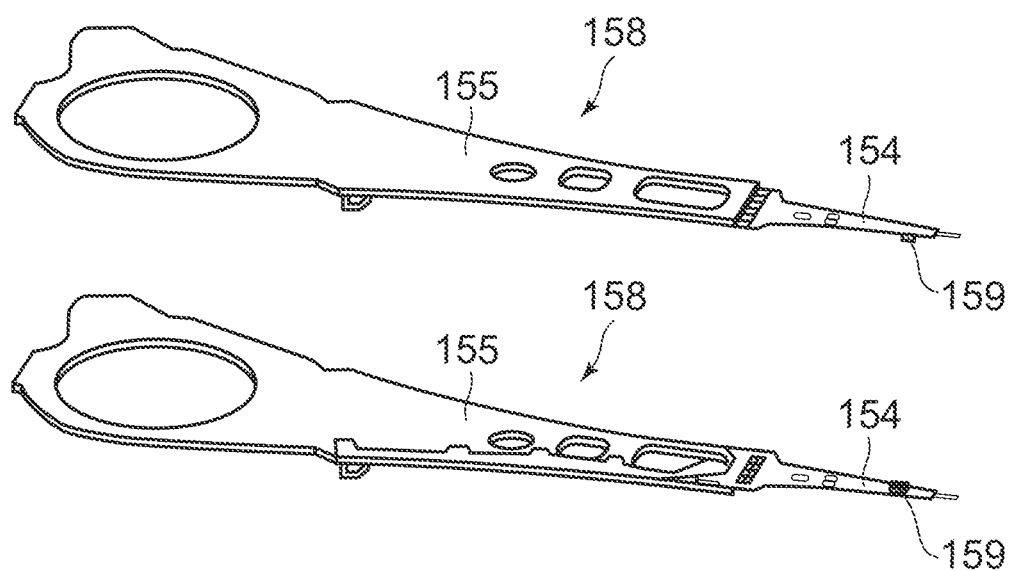

FIGS. 13A and 13B are schematic perspective views illustrating a part of the magnetic recording device according to the embodiment.

The magnetic recording device may be a magnetic recording/reproducing device. As shown in FIG. 12, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 13A is an enlarged perspective view of the head stack assembly 160, illustrating the configuration of a part of the magnetic recording device.

FIG. 13B is a perspective view illustrating the magnetic head assembly (head gimbal assembly: HGA) 158 that forms part of the head stack assembly 160.

As shown in FIG. 13A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 13B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following Technical proposals.

(Technical Proposal 1)

A magnetic head, comprising:
a reproducing section, the reproducing section including:
a first shield;
a second shield;
a third shield;
a fourth shield, a second direction from the third shield to the fourth shield crossing a first direction from the first shield to the second shield;
a first magnetic layer provided between the first shield and the second shield and between the third shield and the fourth shield;
a first intermediate layer provided between the first shield and the first magnetic layer, the first intermediate layer being nonmagnetic; and
a second intermediate layer provided between the first magnetic layer and the second shield, the second intermediate layer being nonmagnetic,
a second intermediate layer length of the second intermediate layer along the second direction being shorter than a first intermediate layer length of the first intermediate layer along the second direction.

(Technical Proposal 2)

The magnetic head according to Technical proposal 1, wherein
a first magnetic layer length of the first magnetic layer along the second direction is between the first intermediate layer length and the second intermediate layer length.

(Technical Proposal 3)

The magnetic head according to Technical proposal 1 or 2, wherein
the reproducing section further includes
a third intermediate layer provided between the third shield and the first magnetic layer, the third intermediate layer being nonmagnetic, and a fourth intermediate layer provided between the first magnetic layer and the fourth shield, the fourth intermediate layer being nonmagnetic, a third intermediate layer length of the third intermediate layer along the first direction is shorter than a first magnetic layer thickness of the first magnetic layer along the first direction, and a fourth intermediate layer length of the fourth intermediate layer along the first direction is shorter than the first magnetic layer thickness.

(Technical Proposal 4)

The magnetic head according to Technical proposal 3, wherein the reproducing section further includes a first insulating member, the first insulating member includes a first insulating region and a second insulating region, a part of the first insulating region is provided between a part of the third shield and a part of the first magnetic layer, and a part of the second insulating region is provided between the part of the first magnetic layer and a part of the fourth shield.

(Technical Proposal 5)

The magnetic head according to Technical proposal 4, wherein another part of the first insulating region is provided between the first shield and the third shield, and another part of the second insulating region is provided between the first shield and the fourth shield.

(Technical Proposal 6)

The magnetic head according to Technical proposal 4 or 5, wherein the first insulating member further includes a third insulating region and a fourth insulating region, a part of the third insulating region is provided between a part of the first magnetic layer and the second shield, and a part of the fourth insulating region is provided between another part of the first magnetic layer and the second shield.

(Technical Proposal 7)

The magnetic head according to Technical proposal 6, wherein another part of the third insulating region is provided between the third shield and the second shield, and another part of the fourth insulating region is provided between the fourth shield and the second shield.

(Technical Proposal 8)

The magnetic head according to Technical proposal 6 or 7, wherein the part of the third insulating region is provided between the third shield and the first magnetic layer in the second direction, and the part of the fourth insulating region is provided between the first magnetic layer and the fourth shield in the second direction.

(Technical Proposal 9)

The magnetic head according to any one of Technical proposals 3-8, wherein the first magnetic layer includes a first side face facing the third intermediate layer, and the first side face is inclined with respect to the first direction.

(Technical Proposal 10)

The magnetic head according to any one of Technical proposals 1-7, wherein at least a part of the first intermediate layer is provided between the third shield and the fourth shield in the second direction.

(Technical Proposal 11)

The magnetic head according to any one of Technical proposals 1-10, wherein a length of the second intermediate layer along a third direction is shorter than a length of the first intermediate layer along the third direction, and the third direction crosses a plane including the first direction and the second direction.

(Technical Proposal 12)

The magnetic head according to Technical proposal 11, wherein a length of the first magnetic layer along the third direction is between a length of along of the second intermediate layer in the third direction and the length of the first intermediate layer in the third direction.

(Technical Proposal 13)

The magnetic head according to any one of Technical proposals 1-12, wherein the first intermediate layer includes a first metal layer and a first compound layer, the first compound layer is provided between the first metal layer and the first magnetic layer, and the first compound layer includes at least one selected from the group consisting of MgO, MgAlO, $SiO_2$, $Al_2O_3$, AlN, $Mg_3N_2$, HfO, and HfN.

(Technical Proposal 14)

The magnetic head according to any one of Technical proposals 1-13, wherein the second intermediate layer includes a second metal layer and a second compound layer, the second compound layer is provided between the first magnetic layer and the second metal layer, and the second compound layer includes at least one selected from the group consisting of MgO, MgAlO, $SiO_2$, $Al_2O_3$, AlN, $Mg_3N_2$, HfO, and HfN.

(Technical Proposal 15)

The magnetic head according to any one of Technical proposals 3-9, wherein the third intermediate layer includes a third metal layer and a third compound layer, the third compound layer is provided between the third metal layer and the first magnetic layer, the third compound layer includes at least one selected from the group consisting of MgO, MgAlO, $SiO_2$, $Al_2O_3$, AlN, $Mg_3N_2$, HfO, and HfN, the fourth intermediate layer includes a fourth metal layer and a fourth compound layer, the fourth compound layer is provided between the first magnetic layer and the fourth metal layer, and the fourth compound layer includes at least one selected from the group consisting of MgO, MgAlO, $SiO_2$, $Al_2O_3$, AlN, $Mg_3N_2$, HfO, and HfN.

(Technical Proposal 16)

The magnetic head according to any one of Technical proposals 1-15, wherein the reproducing section further includes:

a first terminal electrically connected to the first shield;

a second terminal electrically connected to the second shield;

a third terminal electrically connected to the third shield; and a fourth terminal electrically connected to the fourth shield.

(Technical Proposal 17)

The magnetic head according to Technical proposal 16, wherein a voltage between the first terminal and the second terminal when a current flows between the third terminal and the fourth terminal is configured to be changed depending on a detection target magnetic field.

(Technical Proposal 18)

The magnetic head according to Technical proposal 16, wherein a voltage between the third terminal and the fourth terminal when a current flows between the first terminal and the second terminal is configured to be changed depending on a detection target magnetic field.

(Technical Proposal 19)

The magnetic head according to any one of Technical proposals 1-18, wherein the first magnetic layer includes at least one selected from the group consisting of $Co_2MnGa$, CoMnAl, and FePt.

(Technical Proposal 20)

A magnetic recording device, comprising:

the magnetic head according to any one of Technical proposals 1-19; and a magnetic recording medium, the reproducing section being configured to reproduce information recorded on the magnetic recording medium.

According to the embodiments, a magnetic head and a magnetic recording device with improved characteristics can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as shields, magnetic layers, intermediate layers, terminals, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
   a reproducing section, the reproducing section including:
      a first shield;
      a second shield;
      a third shield;
      a fourth shield, a second direction from the third shield to the fourth shield crossing a first direction from the first shield to the second shield;
      a first magnetic layer provided between the first shield and the second shield and between the third shield and the fourth shield;
      a first intermediate layer provided between the first shield and the first magnetic layer, the first intermediate layer being nonmagnetic; and
      a second intermediate layer provided between the first magnetic layer and the second shield, the second intermediate layer being nonmagnetic,
   a second intermediate layer length of the second intermediate layer along the second direction being shorter than a first intermediate layer length of the first intermediate layer along the second direction,
   wherein the reproducing section further includes
      a third intermediate layer provided between the third shield and the first magnetic layer, the third intermediate layer being nonmagnetic, and
      a fourth intermediate layer provided between the first magnetic layer and the fourth shield, the fourth intermediate layer being nonmagnetic,
      a third intermediate layer length of the third intermediate layer along the first direction is shorter than a first magnetic layer thickness of the first magnetic layer along the first direction, and
      a fourth intermediate layer length of the fourth intermediate layer along the first direction is shorter than the first magnetic layer thickness.

2. The magnetic head according to claim 1, wherein
   a first magnetic layer length of the first magnetic layer along the second direction is between the first intermediate layer length and the second intermediate layer length.

3. The magnetic head according to claim 1, wherein
   the reproducing section further includes a first insulating member,
   the first insulating member includes a first insulating region and a second insulating region,
   a part of the first insulating region is provided between a part of the third shield and a part of the first magnetic layer, and
   a part of the second insulating region is provided between the part of the first magnetic layer and a part of the fourth shield.

4. The magnetic head according to claim 3, wherein
another part of the first insulating region is provided between the first shield and the third shield, and
another part of the second insulating region is provided between the first shield and the fourth shield.

5. The magnetic head according to claim 3, wherein
the first insulating member further includes a third insulating region and a fourth insulating region,
a part of the third insulating region is provided between a part of the first magnetic layer and the second shield, and
a part of the fourth insulating region is provided between another part of the first magnetic layer and the second shield.

6. The magnetic head according to claim 5, wherein
another part of the third insulating region is provided between the third shield and the second shield, and
another part of the fourth insulating region is provided between the fourth shield and the second shield.

7. The magnetic head according to claim 5, wherein
the part of the third insulating region is provided between the third shield and the first magnetic layer in the second direction, and
the part of the fourth insulating region is provided between the first magnetic layer and the fourth shield in the second direction.

8. The magnetic head according to claim 1, wherein
the first magnetic layer includes a first side face facing the third intermediate layer, and
the first side face is inclined with respect to the first direction.

9. The magnetic head according to claim 1, wherein
at least a part of the first intermediate layer is provided between the third shield and the fourth shield in the second direction.

10. The magnetic head according to claim 1, wherein
a length of the second intermediate layer along a third direction is shorter than a length of the first intermediate layer along the third direction, and
the third direction crosses a plane including the first direction and the second direction.

11. The magnetic head according to claim 10, wherein
a length of the first magnetic layer along the third direction is between a length of along of the second intermediate layer in the third direction and the length of the first intermediate layer in the third direction.

12. The magnetic head according to claim 1, wherein
the first intermediate layer includes a first metal layer and a first compound layer,
the first compound layer is provided between the first metal layer and the first magnetic layer, and
the first compound layer includes at least one selected from the group consisting of MgO, MgAlO, $SiO_2$, $Al_2O_3$, AlN, $Mg_3N_2$, HfO, and HfN.

13. The magnetic head according to claim 1, wherein
the second intermediate layer includes a second metal layer and a second compound layer,
the second compound layer is provided between the first magnetic layer and the second metal layer, and
the second compound layer includes at least one selected from the group consisting of MgO, MgAlO, $SiO_2$, $Al_2O_3$, AlN, $Mg_3N_2$, HfO, and HfN.

14. The magnetic head according to claim 1, wherein
the third intermediate layer includes a third metal layer and a third compound layer,
the third compound layer is provided between the third metal layer and the first magnetic layer,
the third compound layer includes at least one selected from the group consisting of MgO, MgAlO, $SiO_2$, $Al_2O_3$, AlN, $Mg_3N_2$, HfO, and HfN,
the fourth intermediate layer includes a fourth metal layer and a fourth compound layer,
the fourth compound layer is provided between the first magnetic layer and the fourth metal layer, and
the fourth compound layer includes at least one selected from the group consisting of MgO, MgAlO, $SiO_2$, $Al_2O_3$, AlN, $Mg_3N_2$, HfO, and HfN.

15. The magnetic head according to claim 1, wherein
the reproducing section further includes:
a first terminal electrically connected to the first shield;
a second terminal electrically connected to the second shield;
a third terminal electrically connected to the third shield; and
a fourth terminal electrically connected to the fourth shield.

16. The magnetic head according to claim 15, wherein
a voltage between the first terminal and the second terminal when a current flows between the third terminal and the fourth terminal is configured to be changed depending on a detection target magnetic field.

17. The magnetic head according to claim 15, wherein
a voltage between the third terminal and the fourth terminal when a current flows between the first terminal and the second terminal is configured to be changed depending on a detection target magnetic field.

18. The magnetic head according to claim 1, wherein
the first magnetic layer includes at least one selected from the group consisting of Co2MnGa, CoMnAl, and FePt.

19. A magnetic recording device, comprising:
the magnetic head according to claim 1; and
a magnetic recording medium,
the reproducing section being configured to reproduce information recorded on the magnetic recording medium.

20. A magnetic head, comprising:
a reproducing section, the reproducing section including:
a first shield;
a second shield;
a third shield;
a fourth shield, a second direction from the third shield to the fourth shield crossing a first direction from the first shield to the second shield;
a first magnetic layer provided between the first shield and the second shield and between the third shield and the fourth shield;
a first intermediate layer provided between the first shield and the first magnetic layer, the first intermediate layer being nonmagnetic; and
a second intermediate layer provided between the first magnetic layer and the second shield, the second intermediate layer being nonmagnetic,
a second intermediate layer length of the second intermediate layer along the second direction being shorter than a first intermediate layer length of the first intermediate layer along the second direction,
wherein
a length of the second intermediate layer along a third direction is shorter than a length of the first intermediate layer along the third direction, and
the third direction crosses a plane including the first direction and the second direction.

21. A magnetic head, comprising:
a reproducing section, the reproducing section including:
- a first shield;
- a second shield;
- a third shield;
- a fourth shield, a second direction from the third shield to the fourth shield crossing a first direction from the first shield to the second shield;
- a first magnetic layer provided between the first shield and the second shield and between the third shield and the fourth shield;
- a first intermediate layer provided between the first shield and the first magnetic layer, the first intermediate layer being nonmagnetic; and
- a second intermediate layer provided between the first magnetic layer and the second shield, the second intermediate layer being nonmagnetic, a second intermediate layer length of the second intermediate layer along the second direction being shorter than a first intermediate layer length of the first intermediate layer along the second direction, wherein the reproducing section further includes:
- a first terminal electrically connected to the first shield;
- a second terminal electrically connected to the second shield;
- a third terminal electrically connected to the third shield; and
- a fourth terminal electrically connected to the fourth shield.

* * * * *